June 27, 1933.  H. T. JENKINS  1,916,052
ADJUSTABLE HAND RAKE
Filed Dec. 23, 1932   2 Sheets-Sheet 2
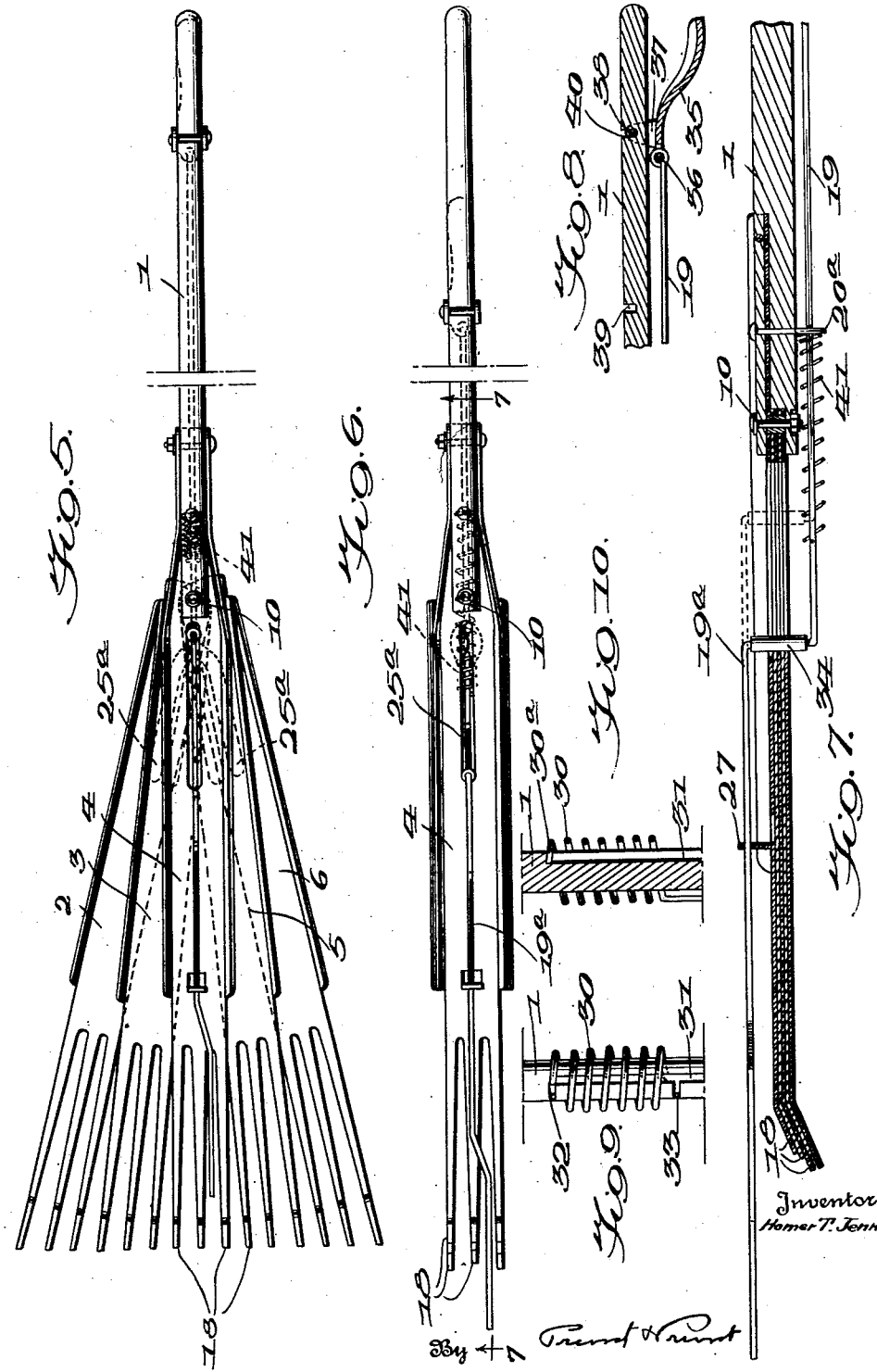
Inventor
Homer T. Jenkins
Attorneys Patented June 27, 1933

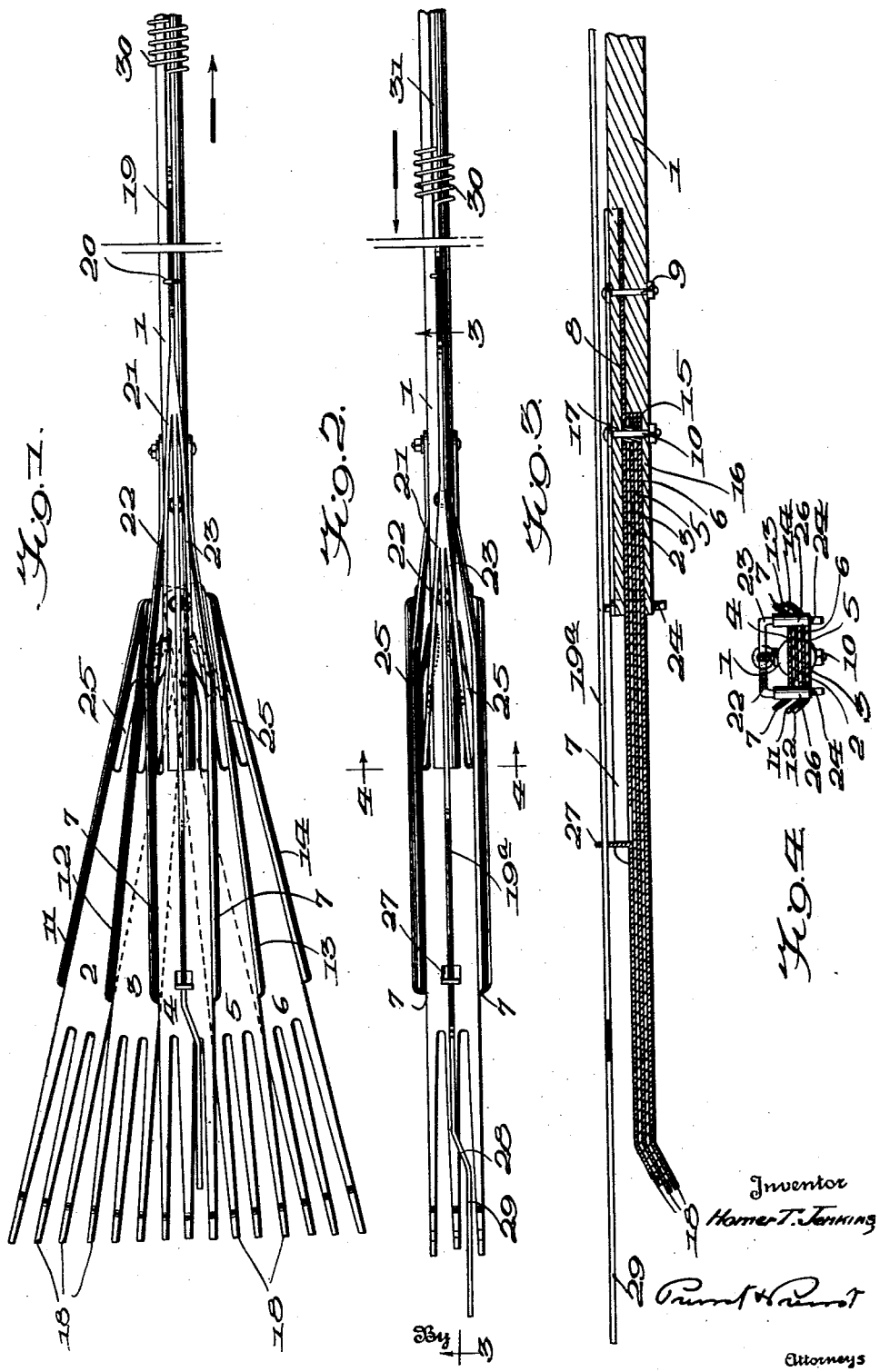

1,916,052

UNITED STATES PATENT OFFICE

HOMER T. JENKINS, OF WASHINGTON, DISTRICT OF COLUMBIA, ASSIGNOR TO CHARLES W. BOLGIANO, OF WASHINGTON, DISTRICT OF COLUMBIA

ADJUSTABLE HAND RAKE

Application filed December 23, 1932. Serial No. 648,683.

My invention consists in new and useful improvements in adjustable hand rakes and has for its object to provide a rake head which may be laterally extended and retracted at the will of the user in order to facilitate access to restricted areas, such for example as underneath and between the stalks of hedges, bushes, and the like.

The particular embodiment of my invention illustrated in the accompanying drawings is in the nature of a broom rake having a plurality of substantially resilient teeth sections arranged in overlapping relation, which, when in extended or spread position, may be conveniently used in clearing leaves, grass and débris from lawns, gardens and the like.

Another object of my invention is to provide an adjustable rake head made up of a plurality of pivotally mounted overlapping sections, each of which carries at its free end a series of uniformly spaced teeth, whereby when the rake head is extended or spread to its fullest extent and when the same is fully retracted, the distance between the individual teeth will remain the same, thus affording an implement with uniform raking facilities.

A further object of my invention resides in my improved cam slot arrangement for affecting the extension and retraction of the rake teeth, said mechanism being extremely simple in construction and operation and at the same time affording a maximum of strength and durability.

A still further object of my invention is to provide a rake head made up of a plurality of pivoted sections which may be easily assembled and disassembled, thus facilitating the installation of replacement parts when necessary.

With the above and other objects in view which will appear as the description proceeds, my invention consists in the novel features herein set forth, illustrated in the accompanying drawings and more particularly pointed out in the appended claims.

In the drawings in which numerals of like character designate similar parts throughout the several views, Fig. 1 is a plan view of the preferred form of my invention showing the rake sections in extended or spread position.

Fig. 2 is a similar view showing the rake sections retracted.

Fig. 3 is an enlarged longitudinal section taken on line 3—3 of Fig. 2.

Fig. 4 is a transverse section taken on line 4—4 of Fig. 2.

Fig. 5 is a plan view of a modified form of rake structure showing the rake sections extended.

Fig. 6 is a similar view showing the sections retracted.

Fig. 7 is an enlarged longitudinal section taken on line 7—7 of Fig. 6.

Fig. 8 is a detail sectional view showing one form of hand operating mechanism.

Fig. 9 is a plan view of another form of handle control, and

Fig. 10 is a transverse section taken at right angles to Fig. 9.

In the drawings, referring to Figs. 1 to 4 inclusive, 1 represents a handle or shaft which may be composed of wood or any other suitable material, to one end of which my improved rake head is adapted to be secured. The rake head consists of a plurality of sections, in the form shown in the drawings, being five in number and designated respectively by the numerals 2, 3, 4, 5 and 6, said sections being preferably stamped out of flat metallic sheet material and pivotally secured together and to the handle 1 to form a substantially fan-like structure.

The top central section 4 is bent angularly for a predetermined distance along its longitudinal edges to form upturned reinforcing fins 7 and this section is somewhat longer than the other sections with its inner end rigidly secured within a longitudinally extending slot or bifurcation 8 in the end of the handle 1, by means of bolts 9 and 10 which extend through said handle. The sections 2 and 3 are formed with upturned reinforcing fins 11 and 12 respectively extending along their outer longitudinal edges, the section 3 underlying the central section 4 and overlying the outer section 2. Likewise on the opposite side of the central section 4, sections 5 and 6 are provided with upturned reinforcing fins 13 and 14 respectively, along their outer edges, the section 5 underlying central section 4 and overlying the outer section 6.

The overlapping inner ends of sections 2, 3, 5 and 6 are provided with registering superposed apertures 15 through which the bolt 10 is adapted to pass to pivotally secure the ends of the sections within an enlargement 16 of the bifurcation or slot 8 in the handle.

Preferably, in order to prevent the jamming of the pivoted ends within the bifurcation, I provide a suitable collar 17 which extends through the openings 15 around the bolt 10 and acts as a spacer for the adjacent faces of the handle slot 16.

The free ends of the sections 2, 3, 4, 5 and 6 are provided with a plurality of rake teeth 18, the ground engaging extremities of which are bent downwardly at an angle as shown in Fig. 3. In the form of my invention herein illustrated, each of the sections is provided with three teeth which may be formed simultaneously with the stamping of the sections from the sheet metal, or they may be additionally secured to said sections, and although this is the preferred number of teeth to be employed on each section, obviously I may employ more or less as desired.

The primary purpose of constructing the rake sections with a plurality of teeth in this manner is to insure uniform spacing between the ground engaging teeth both when the rake sections are extended and retracted. Heretofore efforts have been made to design extension rakes but in all of those structures with which I am familiar, in extending or spreading the rake, the ground engaging teeth were simultaneously spread apart an increasing distance according to the degree of extension of the rake sections, and in the retraction of the rake sections, the ground engaging teeth were correspondingly brought gradually closer together so that there was no uniformity in the spacing of the teeth. Obviously, this disadvantage is overcome with my structure.

The operating mechanism for spreading and retracting the rake sections in the preferred form of the present invention consists of a rod or wire 19 which extends longitudinally of the handle 1 and is retained in sliding engagement thereon by suitable eyelets or guides 20, one end of said rod being provided with a fork-like member 21 having diverging resilient arms 22 and 23, the free extremities of which are bent at right angles as at 24. These ends 24 are adapted to extend transversely through and operatively engage registering cam slots 25 in the rake head sections.

The arrangement of the slots as well as their contour may naturally be varied to suit conditions of rake design without departing from the spirit of my invention. In the form shown in Figs. 1 and 2, I have provided the upper central section 4 with two slots which run parallel to one another and to the edges of the rake section for a portion of their length and then gradually converge toward the axis of the rake head. Each of the movable sections is provided with single slots which extend parallel to the edges of the sections for a portion of their length and then gradually converge toward the axis of the rake head, the converging portions of the slots in sections 2, 3, 5 and 6 terminating at a common point which registers with the adjacent extremity of the respective slot in the stationary section 4.

Thus upon the downward movement of the rod 19, the angular ends of the arms 22 and 23 will traverse the respective slots 25 and cause the overlapping rake sections to retract and lie in superposed relation as shown in Fig. 2, with the outer ends of the slots in registering position, while the upward movement of the rod 19 will cause the rake sections to be extended or spread to a fan-like position as shown in Fig. 1 with the inner ends of the slots in registering position. The resilience of the arms 22 and 23 permits the ends 24 to follow the course of the respective slots in extending and retracting the rake sections.

If desired, I may provide protecting sleeves 26 on the angular ends 24 to prevent wear on the slot engaging arms of the rod.

Beyond the forked portion 21 of the rod 19 I provide an extension 19a which passes through an up-turned ear or lug 27 formed in the central rake head section, the outer extremity of said extension being off-set as at 28 and then extending longitudinally to form a prong 29, the latter being adapted to be extended to a point beyond the extremities of the rake teeth 18, as shown in dotted lines in Figs. 2 and 3, when the rod 19 is in its lowermost position, said prong 29 serving as a single tooth or spear point for removing paper and other débris from a lawn or the like. It will be noted that the off-set prong 29 when not extended lies intermediate the spaced teeth 18 of section 4, and thus does not interfere with the flexibility of said teeth (see Fig. 1).

The upper end of the rod 19 may be provided with any suitable handle for operating the same but the simplest construction and that which I have embodied in the present form of my invention consists of a coil 30 formed from the rod 19 and which encircles the handle or shaft 1, the upper extremity of the coil being bent axially of the handle and adapted to slidably engage a longitudinally extending guide slot or recess 31. Referring to Figs. 9 and 10, it will be seen that by providing off-set portions 32 and 33 in the slot 31, the coil or grip 30 may be locked either in upper or lower positions by simply turning the coil grip so as to bring the inturned end 30a into engagement with the proper off-set portion.

The structure of the modified form of my invention shown in Figs. 5, 6 and 7 is essentially the same as that just described with the exception that instead of a double cam slot arrangement in the rake sections and the cooperating forked arms on the actuating rod, I provide a single row of superposed cam slots 25a, the rod 19 being bent at right angles to form a shoulder 34, said bent portion extending through the slots and then projecting longitudinally again along the upper surface of the rake sections as at 19a and extending through the guide ear 27. With this arrangement, the slot in the stationary section 4 runs parallel with the edges of the section for its entire length and the respective slots of the movable sections are of such contour as to bring about the extension and retraction of the rake sections upon the longitudinal movement of the operating rod 19, much in the same manner as that heretofore described.

In the modified form of my invention I have shown a somewhat different arrangement of hand control which consists of a lever 35 pivotally secured as at 36 to the end of the rod 19 and provided with a yoke 37 which is adapted to embrace the handle 1, said yoke having a cross member 38 which is designed to serve as a fulcrum for the lever 35. At predetermined points in the handle 1 I provide transverse slots 39 and 40 adapted to receive and form bearings for the cross member 38 in the different positions of the lever 35. In the normal operation of the rake sections, that is in extending and retracting the same, the lever 35 will be in the position shown in Fig. 8 with the cross member 38 lying in the recess 40. Thus by gripping the lever 35 and forcing the same toward the handle 1, the rod 19 will be caused to move longitudinally toward the upper end of the handle causing the extension of the rake sections. A coil spring or the like 41 is fixed at one end on the rod 18 with its free end secured to the guide eyelet 20a for causing the automatic return of the rake sections to closed or retracted position upon the release of the lever 35.

When it is desired to extend the single prong on the extension 19a to a point beyond the extremities of the teeth, the yoke 37 is moved laterally of the handle 1 until the cross member 38 clears the recess 40 and the lever and yoke are then moved longitudinally downwardly on the handle until the cross member comes adjacent the lower recess 39. By inserting said cross member in the recess 39, the rod 19 is locked in this position, the spring 41 tending to retain the yoke in place.

It will thus be seen that with a broom rake or the like constructed in accordance with either of the forms of my invention described, I have provided an economical, simple and serviceable implement which may be used in extended position in a similar manner to the conventional broom rake, and which when retracted, may be advantageously employed in clearing leaves and débris from underneath and between the stalks, hedges, bushes and the like. Furthermore, the retractability and overlapping of the rake head greatly facilitates its storage and shipment in that it requires a considerably smaller space than rigid rake structures.

Another decided advantage which my invention possesses is the fact that the individual sections may be easily replaced without discarding the entire rake.

While I have shown and described two forms of cam slot mechanism for bringing about the spreading and retraction of the rake sections, it is to be understood that I consider any suitable mechanism for spreading and retracting a fan-shaped rake head made up of overlapping pivoted sections, to come within the scope of my invention. Furthermore, I desire to include the application of my improved cam slot mechanism to various modified forms of rake sections whether arranged in overlapping relation or otherwise.

From the foregoing it is believed that the construction and advantages of my invention may be readily understood by those skilled in the art without further description, it being borne in mind that numerous changes may be made in the details disclosed without departing from the spirit of the invention as set forth in the following claims.

What I claim and desire to secure by Letters Patent is:—

1. A hand rake comprising a handle, an adjustable rake head secured to said handle and including a plurality of sections arranged in overlapping relation and mounted on a common pivot carried by said handle, a plurality of substantially uniformly spaced teeth carried at the free end of each of said sections, cam slots in said sections, and means carried by said handle for operatively engaging said cam slots to spread and retract said sections.

2. A hand rake comprising a handle, an adjustable rake head secured to said handle and including a plurality of sections arranged in overlapping relation and mounted on a common pivot carried by said handle, a plurality of substantially uniformly spaced teeth carried at the free end of each of said sections, cam slots in said sections, an operating rod slidably supported by said handle, and means carried by said rod for operatively engaging said cam slots, whereby the longitudinal movement of said rod in one direction will cause the spreading of said sections, and the reverse movement of said rod will affect the retraction of said sections.

3. In an adjustable hand rake including a handle, a rake head comprising a series of sections, each carrying a plurality of substantially uniformly spaced teeth at one end, one of said sections being rigidly secured to said handle and provided with a pair of oppositely disposed cam slots, the remainder of said sections being pivotally secured to said handle in overlapping relation and lying beneath said stationary section, certain of said pivoted sections having cam slots which register with one of the cam slots in said stationary section, and others of said pivoted sections having cam slots which register with the other of the slots in said stationary section, an operating member carried by said handle and having a pair of arms each of which is adapted to operatively engage the respective registering cam slots in said sections to affect the spreading and retraction of said sections.

4. In an adjustable hand rake including a handle, a rake head comprising a plurality of sections, one of said sections being rigidly secured to said handle, the remainder of said sections being pivotally secured to said handle in overlapping relation and lying beneath said stationary section, a longitudinally extending straight slot in said stationary section, cam slots in said pivoted sections adapted to register with said slot, a rod slidably carried by said handle, a portion of said rod being bent at right angles to form a shoulder adapted to operatively engage said slots, whereby upon the longitudinal movement of said rod, said sections will be caused to spread and retract.

5. A hand rake including a handle, a rake head carried by said handle and comprising a plurality of pivotally mounted sections of substantially resilient material, arranged in overlapping relation, the free ends of each of said sections carrying a plurality of integral substantially uniformly spaced teeth, the outer longitudinal edges of each section being bent angularly to form a reinforcing fin, and means carried by said handle for spreading and retracting said sections.

6. A hand rake including a handle, a rake head carried by said handle and comprising a plurality of pivotally mounted sections, teeth carried at the free ends of said sections, cam slots in said sections, and means carried by said handle for operatively engaging said slots to spread and retract said sections.

7. A rake comprising a support, a plurality of pivotally mounted rake sections carried by said support, a stationary member carried by said support, at least one fixed slot in said stationary member, cam slots in said pivoted sections adapted to register with said fixed slot, and an operating element adapted to simultaneously engage said fixed slot and cam slots, whereby said pivoted sections may be spread and retracted.

8. A hand rake as claimed in claim 2 wherein one end of said operating rod is coiled to encircle said handle and form a grip member.

9. A hand rake as claimed in claim 2 wherein one end of said operating rod is coiled to encircle said handle and form a grip member, a longitudinal guide slot in said handle, and means carried by said grip member for engaging said slot.

10. A hand rake as claimed in claim 2 wherein one end of said operating rod is coiled to encircle said handle and form a grip member, a longitudinal guide slot in said handle, means carried by said grip member for engaging said slot, and means for locking said grip member to retain said rake sections in spread and retracted positions.

11. A hand rake comprising a handle, an adjustable rake head secured to said handle and including a plurality of pivotally mounted sections arranged in fan fashion with a substantial portion of their longitudinal edges in overlapping relation to one another, rake teeth carried at the free ends of said sections, and means for spreading and retracting said sections.

12. A hand rake comprising a handle, an adjustable rake head secured to said handle and including a plurality of pivotally mounted sections arranged in fan fashion with a substantial portion of their adjacent longitudinal edges in overlapping relation to one another, a plurality of substantially uniformly spaced teeth carried at the free end of each of said sections, and means for spreading and retracting said sections.

13. A hand rake comprising a handle, an adjustable rake head secured to said handle and including a plurality of sections mounted on a common pivot carried by said handle and arranged in fan fashion with a substantial portion of their length in overlapping relation to one another, a plurality of substantially uniformly spaced teeth carried at the free end of each of said sections, and means on said handle for operatively engaging said sections to spread and retract the same.

14. A rake comprising a support, a plurality of pivotally mounted rake sections carried by said support and arranged with a substantial portion of their adjacent longitudinal edges normally in overlapping relation to one another, rake teeth carried at the free ends of said sections, and means for spreading said sections and for retracting the same so that they will lie longitudinally in superposed relation to one another.

15. A rake comprising a support, a plurality of movably mounted substantially flat longitudinally extending rake sections carried by said support and arranged with a substantial portion of their adjacent longitudinal edges normally in overlapping relation, rake teeth carried at the free ends of said sections, and means for spreading said sections and for retracting the same so that they will lie longitudinally in superposed relation to one another.

In testimony whereof I affix my signature.

HOMER T. JENKINS.